United States Patent [19]
Tanikoshi

[11] 3,946,292

[45] Mar. 23, 1976

[54] BRUSHLESS MOTOR DRIVING SYSTEM

[75] Inventor: Kinji Tanikoshi, Kawasaki, Japan

[73] Assignees: Canon Kabushiki Kaisha; Canon Seiki Kabushiki Kaisha, both of Tokyo, Japan

[22] Filed: July 8, 1974

[21] Appl. No.: 486,316

[30] Foreign Application Priority Data
July 20, 1973 Japan.................................. 48-81367
July 11, 1973 Japan........................... 48-82500[U]

[52] U.S. Cl. ................ 318/138; 318/254; 318/289; 318/290
[51] Int. Cl.² ........................................ H02K 29/00
[58] Field of Search ........... 318/138, 254, 289, 290, 318/685, 696, 293

[56] References Cited
UNITED STATES PATENTS

| | | | |
|---|---|---|---|
| 3,210,631 | 10/1965 | Niccolls .......................... | 318/254 X |
| 3,559,014 | 1/1971 | Rakes ............................. | 318/254 X |
| 3,604,960 | 9/1971 | Krestel ........................... | 318/254 X |
| 3,609,492 | 9/1971 | Rakes .............................. | 318/290 X |
| 3,651,368 | 3/1972 | Hanada ............................. | 318/254 |
| 3,831,072 | 8/1974 | Tanikoshi ........................ | 318/29 X |

*Primary Examiner*—Gene Z. Rubinson
*Attorney, Agent, or Firm*—Fitzpatrick, Cella, Harper & Scinto

[57] ABSTRACT

A driving system for reversibly rotating a D.C. brushless motor is disclosed. The system comprises Hall generators for detecting positions of a rotor, and a drive circuit for controlling conduction and interruption of current applied to stator windings making use of output of said Hall generators. The system further comprises an inversion control circuit including a switch for reversibly switching polarities of an applied power source in order to reversibly rotate the D.C. motor thereby reversibly inverting the D.C. motor in response to signals from the power source whose polarities vary alternately.

15 Claims, 34 Drawing Figures

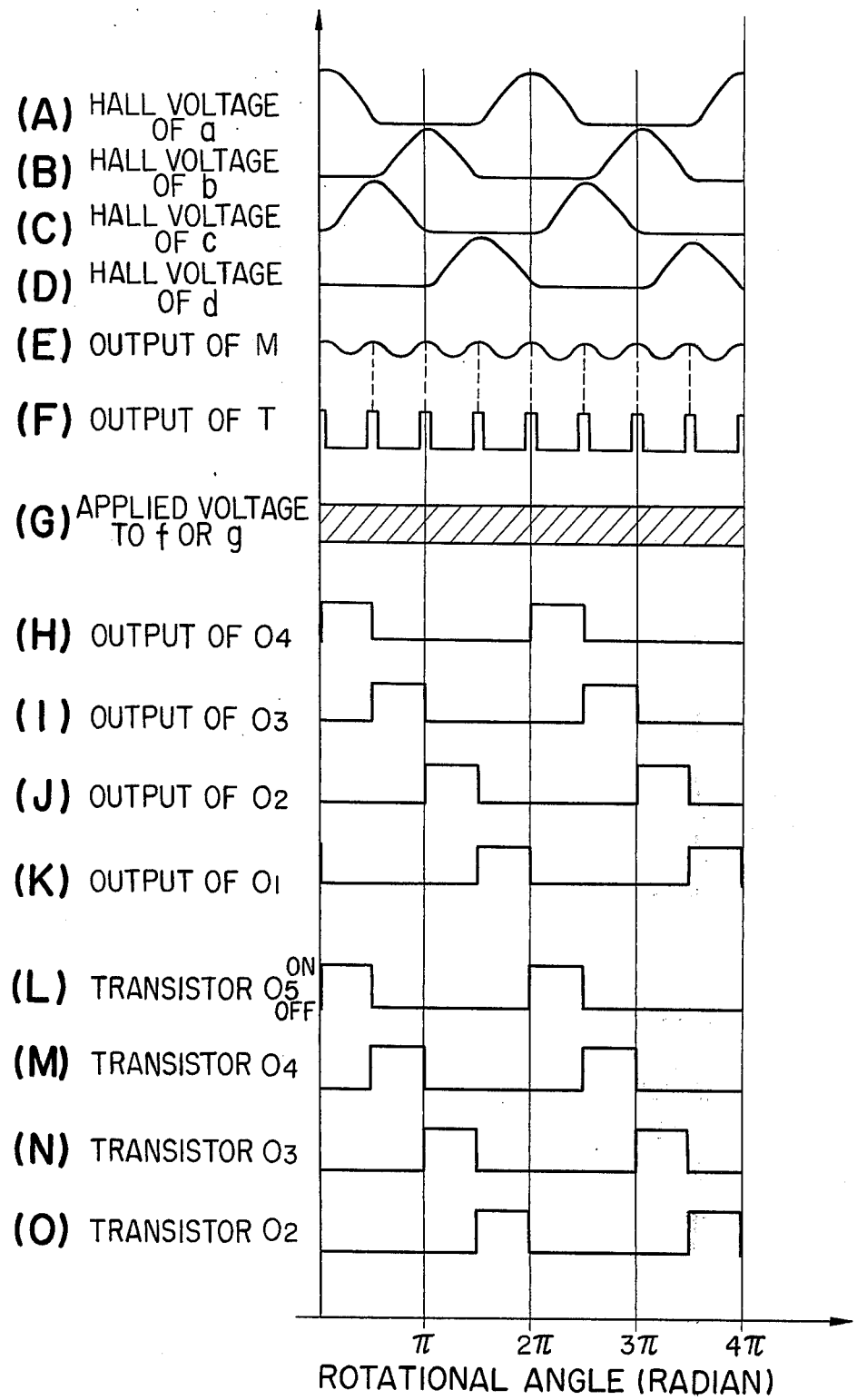

BRUSHLESS MOTOR DRIVING SYSTEM

BACKGROUND OF THE INVENTION

1. Field of the Invention

The present invention relates to brushless motor driving systems and more particularly to a brushless motor driving system which will detect positions of a rotor composed of a permanent magnet by way of magnetic flux sensing elements such as Hall generators to suitably distribute the driving exciting current flown into field coils thereby imparting a rotative force to the motor, wherein alternating signals of low frequencies are applied as a power source, the direction of power supply to the motor being inverted by said alternation to reversely rotate the motor.

2. Description of the Prior Art

In brushless motors of the type which produce rotative torque in a predetermined direction by using field detecting generators such as Hall generators to vary distribution of current flown into driving coils by signals from said Hall generators, the reversible rotation of the motor may not be accomplished by merely inversely switching polarities of the power source as is effected by conventional D.C. commutator motors. This is due to the fact that the rotational direction of a rotor cannot be inverted by mere simple inversion of polarities of the power source because of polarities, etc. of semiconductor elements, which are incorporated in a driving circuit for controlling current flown into the coils. For this reason, in prior art reversibly rotative brushless motors, it is necessary to provide a special inverting circuit in consideration of polarities of D.C. input into Hall generators and operative direction of transistors in the driving circuit, and the inversion and switching mechanism therefor disadvantageously becomes complicated. For instance, the reversible D.C. motor is often used as a servo-motor or as a reference motor for measuring rotative torque of a motor and the like. However, such a prior art D.C. motor requires at least four lead wires in addition to a power supply lead wire in order to reverse the motor and performs its commutating function through non-contact so that, when Hall generators or the like are used, power supply terminals to said Hall generators and output terminals naturally increase. As a result, in the prior art D.C. motors, the number of lead wires connected with a single reversible motor is increasingly required; the working condition at the time of assembly takes a turn for the worse; and it becomes costly. Particularly, in use of the above-described reversible motor as a reference motor for measuring torque, the increase in number of lead wires more than two power supply lead wires hereinbefore described accordingly requires to increase the strength of bundling said lead wires, thus lacking in softness. This has been a fatal drawback causing an error in the measure of torque.

SUMMARY OF THE INVENTION

It is therefore an object of this invention to overcome the limitations noted above with respect to prior art systems by providing a brushless motor driving system in which the reversible rotation of a motor may be accomplished by merely switching polarities of a power source.

It is a further object of this invention to provide a brushless motor driving system in which current of a predetermined direction is normally applied, irrespective of switching polarities of the power source, to a driving circuit for conducting current to coils of motor, and switching means is provided in a field conversion generator circuit such as Hall generators or the like, said switching means being switched in response to switching polarities of the power source to effect reversible rotation of the motor.

It is another object of this invention to provide a brushless motor driving system in which means is provided to control at least either direction of D.C. input to a motor rotational field detecting circuit including Hall generators, or order of voltage signals applied to coils ejected from said circuit, said means being switched in response to switching polarities of the power source of the motor, resulting in the rotational direction of the motor being inverted.

It is yet another object of this invention to provide a motor driving system used in a D.C. brushless motor adapted to detect positions of a rotor composed of a permanent magnet by way of Hall generators thereby switching driving current flow into field coils, wherein a motor driving unit consisting of a plurality of transistors and field coils comprises a diode bridge circuit normally supplied with current from a predetermined direction and Hall generators supplied with current through two constant-voltage circuits symmetrically arranged from one another with respect to the power source, the direction of feeding current to said Hall generators being inverted by inversion of polarities of the power source to effect reversible rotation of the motor.

It is still another object of this invention to provide a motor driving system used in a D.C. brushless motor adapted to detect positions of a rotor composed of a permanent magnet by way of Hall generators thereby switching driving current flow into field coils, wherein a Hall generator unit supplied with current through a transistor constant-voltage circuit and a motor driving unit consisting of a plurality of transistors and field coils comprise a diode bridge circuit normally supplied with current from a predetermined direction, comprising means for combining outputs of said Hall generators to receive it into a reversible shift ring counter and for applying the output of said counter into transistors in said motor driving unit, and means for inverting the shift direction of said counter by way of inversion of polarities of the power source, whereby the reversible rotation of motor may be effected.

It is a further object of this invention to provide a brushless motor driving system comprising means for automatically switching a circuit which will switch and control a Hall generator circuit in response to the switching of polarities of power source, a transistor circuit connected in series with the driving coil of said motor to control driving current, means for dividing the constant-voltage source and regulating an input voltage received into said transistor circuit, and an amplification circuit for suitably dividing and amplifying the source voltage, whereby the number of rotations of the motor is varied by said input voltage regulating means and the output of said amplification circuit is received into said transistor circuit vary suitably thereby the variable characteristic of numbers of rotation in said circuit.

It is another object of this invention to provide a brushless motor driving system comprising a motor drive control means for switching a Hall generator circuit in response to change-over of polarities of power source to place in the automatically inversible condition and means for bringing input current into said Hall generator in a constant-current form, whereby variation of Hall output due to magneto-resistance effect is minimized to stabilize rotation of the motor.

It is a final object of this invention to provide a motor driving circuit comprising a motor drive control means for switching a Hall generator circuit in response to changeover of polarities of a power source in the automatically inversible condition, a drive transistor circuit for receiving output from said control means to feed current into coils in the motor and a diode circuit connected between the output terminal of said Hall generator and the collector terminal of the drive transistor so that, when voltage between the collector and the emitter of said drive transistor is low, output signals of said Hall generator bypass by way of said diode circuit to save the input of said drive transistor thereby stabilizing the rotation of motor.

Other objects and advantages of the present invention will become apparent from the following description of embodiments with reference to the accompanying drawings.

BRIEF DESCRIPTION OF THE DRAWINGS

FIGS. 4 (A) – (O) show signal waveforms at certain parts in the electrical circuit diagram of FIG. 1, the axis of abscissa representing rotational angles of a rotor.

DESCRIPTION OF THE PREFERRED EMBODIMENTS

Figure 1:
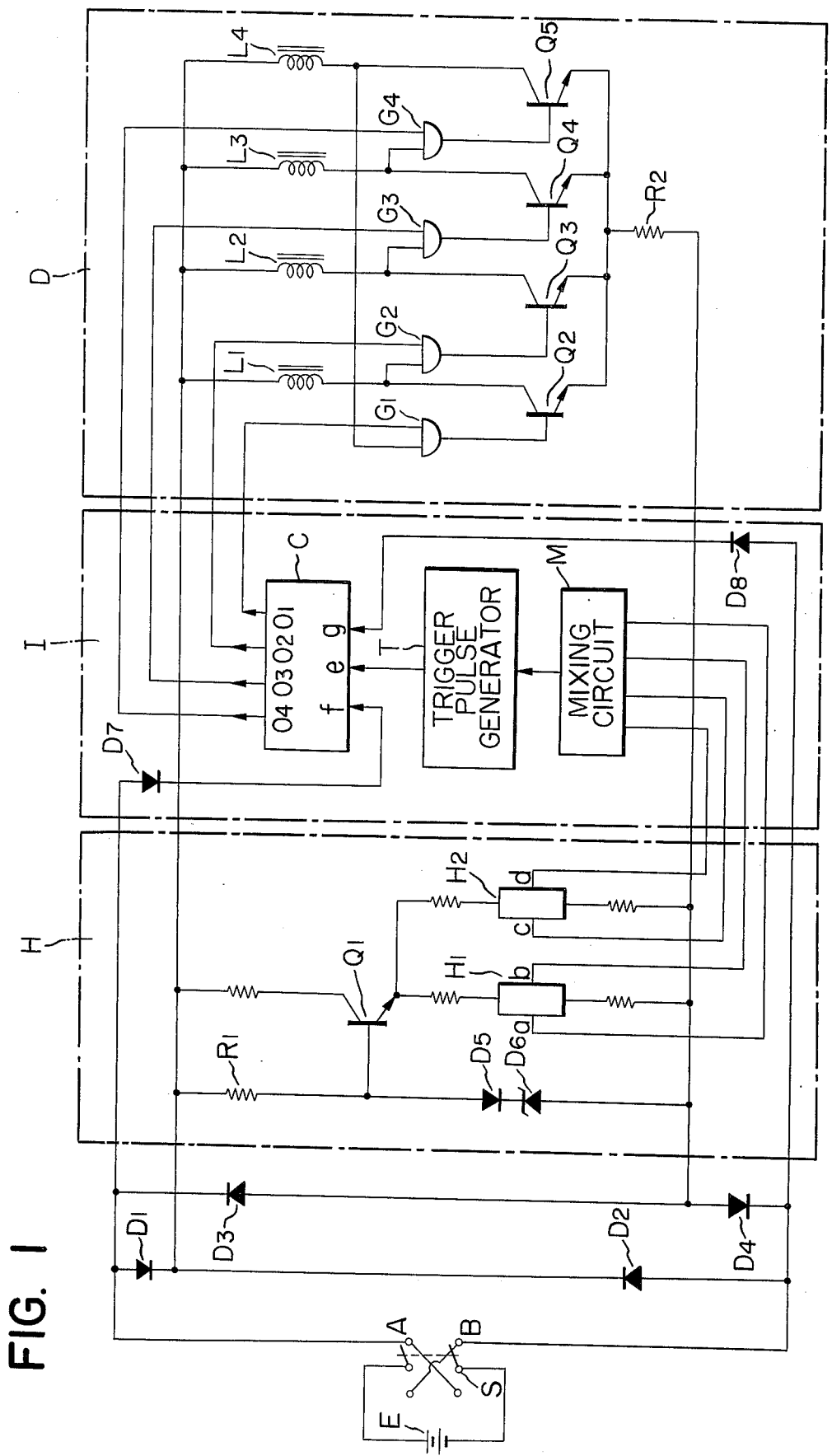
FIG. 1 is an electrical circuit diagram of one preferred embodiment of a brushless motor driving system in accordance with the present invention.

The arrangement of the present invention will now be described with reference to the accompanying drawings. FIG. 1 is a circuit diagram of one preferred embodiment of a Hall motor driving system in accordance with the present invention. In FIG. 1, the system comprises a D.C. power source E and a change-over switch S, polarities of terminals A and B being inverted by changing over said switch S between the left and the right. The system further comprises a Hall generator unit H, a motor driving unit D, and diodes $D_1$-$D_4$ connected in the form of a bridge, to the outputs of which said Hall generator H and motor driving unit D are connected. A circuit I is provided to invert and control the order of applying a Hall generator output to the driving unit D. The Hall generator unit H has Hall generators $H_1$ and $H_2$ connected with an emitter output circuit in a constant-voltage circuit consisting of a resistor $R_1$, diodes $D_5$, $D_6$ and a transistor $Q_1$, said Hall generators $H_1$, $H_2$ being arranged on a stator of the motor in a suitable manner opposite to the magnetic poles of the rotor. The Hall generators have output terminals a, b, c, d, outputs of which are received into a signal composer M in the inversion and control circuit I, and a trigger signal generator T is triggered by the output from the signal composer M to generate pulse signals. The reference character C denotes a reversible shift type ring counter. The motor driving circuit D comprises field coils $L_1$-$L_4$ of the motor, driving transistors $Q_2$-$Q_5$, AND circuits $G_1$-$G_4$, and a resistor $R_2$.

Operation of this circuit will now be described with reference to FIGS. 1 and 4.

Assume that change-over switch S is changed-over so that the terminal A thereof occupies the positive position (+) while the terminal B thereof occupies the negative position (−), the Hall generators $H_1$ and $H_2$ will have current flown into a circuit of

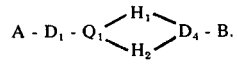

Hence, the positive (+) Hall voltages are produced, as shown in FIGS. 4 (A) – (D), on the order of a, b, c, and d in the output terminals of Hall generators $H_1$, $H_2$ in response to rotation of the rotor, and these Hall voltages are successively applied to the composer M. The trigger signal generator circuit T is triggered by the output of the composer M as shown in FIG. 4 (E), and a trigger pulse shown in FIG. 4 (F) is produced from the output thereof in response to rotation of the motor. This trigger pulse is received into an input terminal e of the reversible ring counter C. This counter C is designed to be selectively shifted to the right or left in response to the input signal when the positive (+) potential as shown in FIG. 4 (G) is applied to input terminal f or g. When the positive (+) pole of the power source is connected with the terminal A, diode $D_7$ is energized while diode $D_8$ is deenergized so that, the positive (+) potential is applied to the terminal f, causing the counter to shift to the right such that the trigger pulse to the terminal e is received. Consequently, the outputs of the counter C produce outputs as shown in FIGS. 4 (H) - (K) on the order of $O_4$ - $O_3$ - $O_2$ - $O_1$, which are then received into AND circuits $G_1$ - $G_4$ in the motor driving unit. These AND circuits are designed to be turned ON by the output of the counter C and the potentials in the driving circuits. For instance, the AND circuit $G_1$ is turned ON by the output $O_1$ of the counter C and the potential in the circuit of coil $L_4$, that is, by the signal from $O_1$ when the circuit of coil $L_4$ is in the OFF state. The AND circuits so designed as just described above are used to make sure that conduction of current to the preceding coil has been completed and to allow conduction of current to the successive coil so that an overlapped portion of operating time between both coils may be eliminated to produce no irregularities in producing torque.

Figure 3:
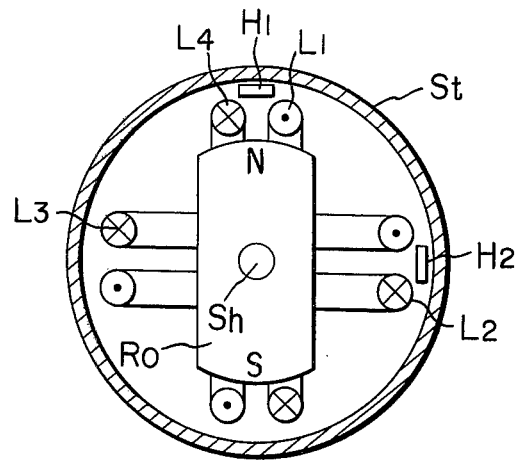
FIG. 3 is a sectional view illustrating the construction of a brushless motor applicable to the present invention.

Accordingly, signals are fed by the aforementioned output from the reversible shift counter C to the AND circuits on the order of $G_4 - G_3 - G_2 - G_1$ to logically receive positive signals produced when the aforementioned coils $L_4 - L_1$ are not operated, thus driving the AND circuits into the ON state on the order of $G_4 - G_3 - G_2 - G_1$, output signals of which are fed to transistors $Q_2 - Q_5$, which constitute a driving circuit, whereby these transistors are driven into the conductive state on the order of $Q_5 - Q_4 - Q_3 - Q_2$ as shown in FIGS. 4 (L)-(O). Thus, driving current is flown into driving coils connected with the collectors of the aforementioned transistors on the order of $L_4 - L_3 - L_2 - L_1$. If these driving coils are arranged as shown in FIG. 3 later described, the rotor rotates counterclockwise.

Next, when the change-over switch S is changed-over so that the terminal B thereof occupies the positive position (+) while the terminal A thereof occupies the negative position (−), the direction of supply current to the Hall generator unit H and motor driving unit D remains unchanged, similar to the case as hereinbefore described, due to the diode bridge circuit, so that the outputs from the Hall generators $H_1$, $H_2$ are the same as described above. However, the input terminal $g$ of the counter C becomes the positive (+) potential to shift the counter to the left, and the output of the ring counter C is reversed by the trigger pulse from the Hall generator unit, that is, on the order of $O_1 - O_2 - O_3 - O_4$. As a result, driving current is flown into the field coils of the motor driving unit D being switched in a manner as described on the order of $L_1 - L_2 - L_3 - L_4$ thus causing the motor to rotate in the direction opposite to the former case. From the above, it will be appreciated in the arrangement shown in FIG. 1 that the counting direction of the reversible shift type ring counter may be inverted by switching polarities of the power source so as to reversibly rotate the motor, thus providing inversion of proper and reverse rotation of the motor by way of extremly simple circuit and switching mechanism. Further, the provision of AND circuits enables a proper switching operation to minimize torque fluctuation caused by the switching operation.

Figure 2:
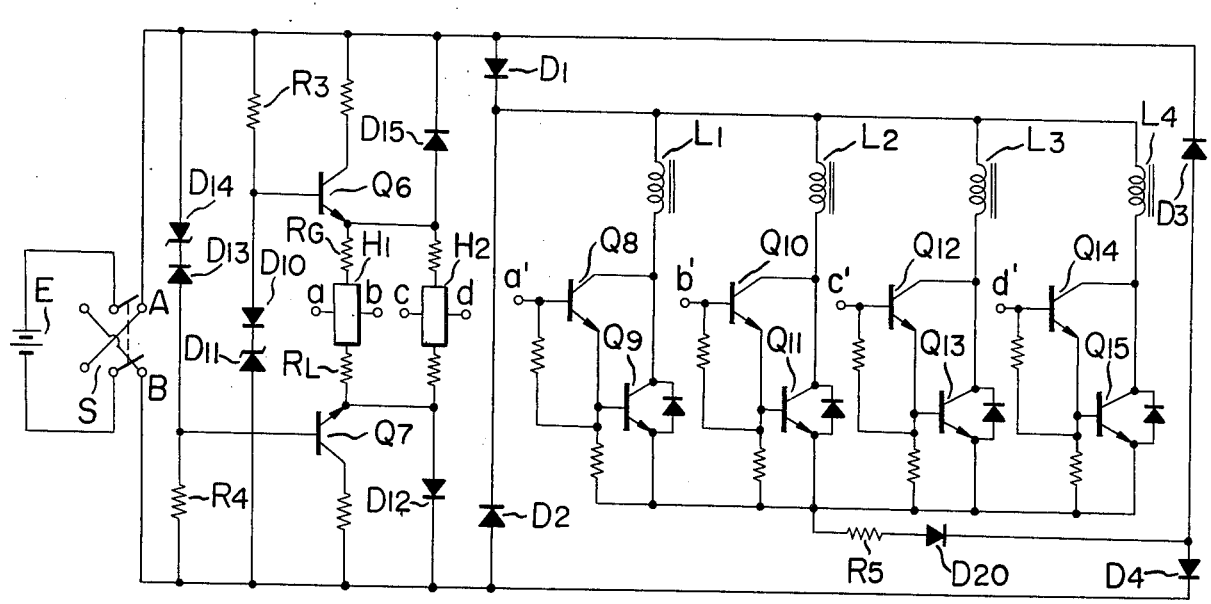
FIG. 2 is an electrical circuit diagram of another preferred embodiment of a brushless motor driving system in accordance with the present invention.

Referring now to FIG. 2 being an electrical circuit diagram of another preferred embodiment, in which like reference characters designate corresponding parts in FIG. 1, the polarities of the power source applied to the Hall generator unit are inverted to thereby invert the order of Hall voltages thereof. The circuit in FIG. 2 is not provided with the inversion control circuit shown in FIG. 1. In FIG. 2, the arrangement comprises a first constant-voltage circuit consisting of a resistor $R_3$, a diode $D_{10}$, a Zener diode $D_{11}$ and a transistor $Q_6$, and a second constant-voltage circuit symmetrically connected with the former consisting of a resistor $R_4$, a diode $D_{13}$, a Zener diode $D_{14}$, and a transistor $Q_7$. Between emitters of said constant-voltage circuits are connected Hall generators $H_1$, $H_2$. Assume now that the power source is changed-over so that the terminal A thereof occupies the positive position (+) while the terminal B thereof occupies the negative position (−), the Hall generators $H_1$ and $H_2$ will have current flown in the direction of

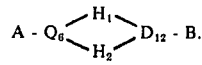

Figure 5:
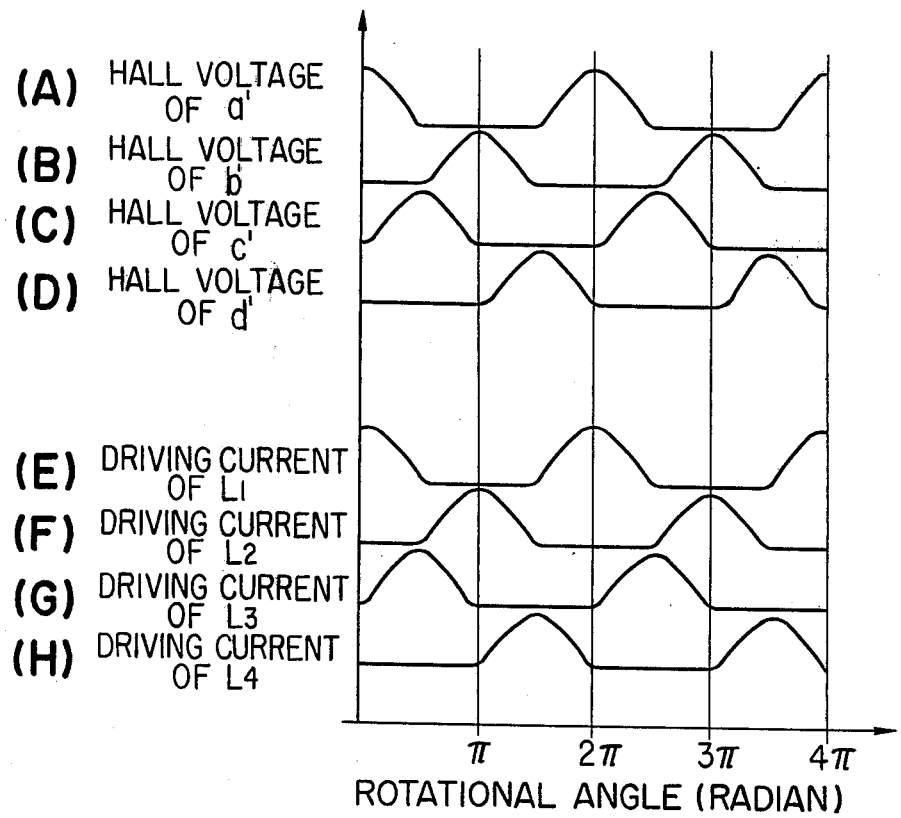
FIGS. 5 (A) – (H) show signal waveforms at certain parts in the electrical circuit diagram of FIG. 2, the axis of abscissa representing rotational angles of a rotor.

Hence, the outputs of the Hall generators become the positive potential as shown in FIGS. 5 (A) - (D) on the order of terminals $a' - c' - b' - d'$. Conversely, when the terminal B is changed-over to occupy the positive position (+) while the terminal A to occupy the negative position (−), the Hall generators $H_1$ and $H_2$ will have current flown in the direction of

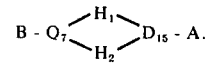

Hence, the outputs of the Hall generators become the positive potential on the order of terminals $d' - b' - c' - a'$. The motor driving unit comprises a transistor circuit consisting of driving transistors $Q_8$, $Q_{10}$, $Q_{12}$ and $Q_{14}$ connected with the aforementioned output terminals $a'$ through $d'$, respectively, of the Hall generators, and transistors $Q_9$, $Q_{11}$, $Q_{13}$ and $Q_{15}$ in the form of a Darlington connection. Resistor $R_5$ and diode $D_{20}$ for regulating voltage between the base and emitter are connected with a common emitter circuit of the aforementioned transistors. Driving coils $L_1 - L_4$ are connected with the common collector side of the transistors $Q_8 - Q_{15}$, respectively.

When the Hall voltage is produced in the output terminals of Hall generators $H_1$, $H_2$ as hereinbefore described, a pair of transistors in the driving circuit connected with said output terminals are driven into the conductive state, thus energizing coils corresponding thereto. Assume that outputs are produced in the output terminals of the Hall generator on the order of $a' - c' - b' - d'$, as shown in FIGS. 5 (A) - (D), motor driving current is fed to coils on the order of $L_1 - L_3 - L_2 - L_4$ as shown in FIGS. 5 (E) - (H). Therefore, at this time, if the rotational direction is assumed to be a proper direction, the Hall voltage is produced on the order of $d' - b' - c' - a'$ when the polarities of the power source are inverted, and the output therefrom changes the order wherein transistors in the driving circuit are energized, resulting in the coils being energized on the order of $L_4 - L_2 - L_3 - L_1$ to direct the rotational direction of the rotor opposite to that previously described. The motor driving unit is supplied with current through the bridge connection composed of diodes $D_1 - D_4$ in a manner similar to that described in conjunction with FIG. 1, that is, it is supplied with current normally in the same direction irrespective of switching polarities of power source. It will be appreciated also in this specific circuit that the reversible rotation of the motor may be accomplished by mere change-over of the change-over switch S, and further the D.C. input to the Hall generators may be fed through the constant-voltage circuits symmetrically arranged, thereby providing a stabilized operation.

FIG. 3 illustrates one form of construction of a D.C. brushless motor applicable to the driving circuits shown in FIGS. 1 and 2, and to a driving circuit in the preferred embodiment later described. In FIG. 3, rotor Ro is mounted rotatably on the shaft Sh, said rotor having at least a pair of magnetic poles with opposite polarities. Stator St has at least a pair of flux-producing windings $L_1 - L_4$ positioned in torque-producing relation with said rotor. The cylindrical stator St has therein a pair of Hall generators $H_1$, $H_2$ positioned in fixed relation to said stator and angularly spaced apart from each other by 90° and in magnetic relation to said rotor so as to sense the magnitude of the rotor flux density as a function of the angular position of said rotor.

Figure 6:
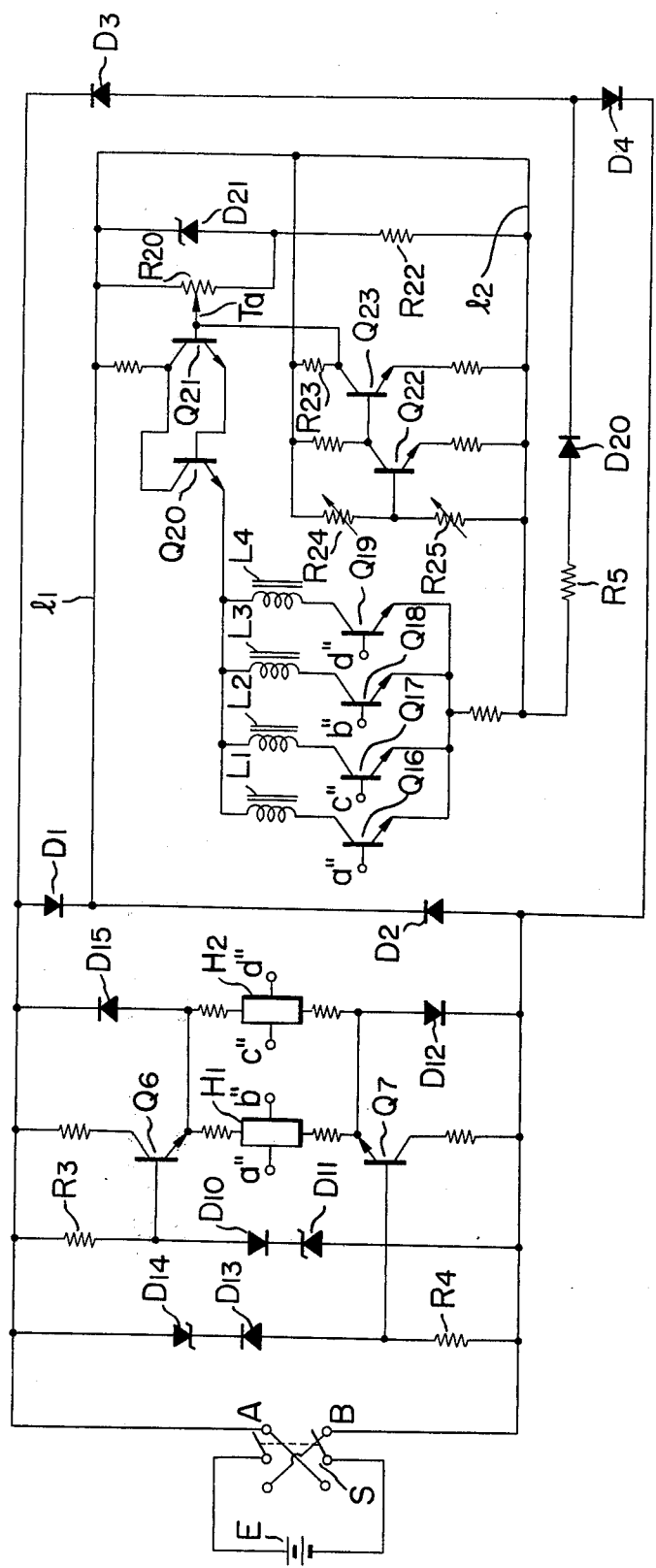
FIG. 6 is an electrical circuit diagram of a further embodiment of a brushless motor driving system in accordance with the present invention.

FIG. 6 is an electrical circuit diagram of a further embodiment of the system in accordance with the present invention, in which like reference characters designate corresponding parts in FIGS. 1 and 2. The electrical circuit shown in FIG. 6 incorporates the power source polarity switching means and the circuit of Hall generators shown in FIG. 2 without modification, and a modified form of motor driving unit is added therein. This preferred mode of embodiment is characterized in that the rotational direction of motor may be automatically reversed in response to the switching of polarities of power source, and that as a second feature, the variable range of number of rotation of said motor may be determined by the variable range of the applied voltage, and the characteristic of the voltage to the number of rotation may suitably be selected.

Output terminals $a''$, $b''$, $c''$ and $d''$ of the Hall generators $H_1$, $H_2$ in this specific circuit are connected with base input terminals, respectively, of driving transistors $Q_{16}$, $Q_{17}$, $Q_{18}$ and $Q_{19}$ in the motor driving circuit. These transistors have their collector terminals connected with ends of coils $L_1 - L_4$ shown in FIGS. 1 - 3. These coils have their other ends connected with the emitter of transistor $Q_{20}$, base and collector of which are connected with emitter and collector, respectively, of successive transistor $Q_{21}$. This transistor $Q_{21}$ has the base connected with the movable tap point Ta of resistor $R_{20}$ for regulating input voltage. Between the positive (+) side lead wire $l_1$ and the negative (−) side lead wire $l_2$ in the driving circuit are connected a Zener diode $D_{21}$ for imparting constant-voltage and a dividing resistor $R_{22}$. With the dividing point between variable dividing resistors $R_{24}$ and $R_{25}$ is connected a base of transistor $Q_{22}$, the collector of which is connected with the base of successive transistor $Q_{23}$. The transistor $Q_{23}$ has its collector connected with the base of said transistor $Q_{21}$ and connected with the positive (+) side lead wire $l_1$ through the resistor $R_{23}$.

Figure 8:
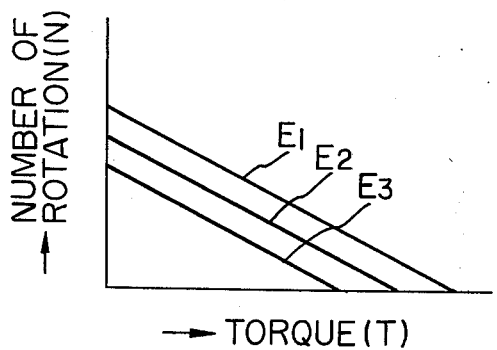
FIG. 8 is a graphic representation illustrating relations between torque and variation of number of rotation of the motor in accordance with the driving system shown in FIG. 6.
Figure 9:
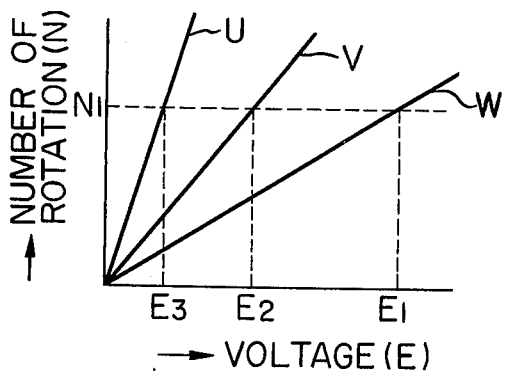
FIG. 9 is a graphic representation illustrating relations between voltage and variation of number of rotation of the motor in accordance with the driving system shown in FIG. 6.

Operation of circuit shown in FIG. 6 will now be described with reference to FIGS. 8 and 9.

Assume now that change-over switch S is changed-over so that the terminal A thereof occupies the positive position (+) while the terminal B thereof occupies the negative position (−), the magnetic poles of the rotor rotate to flow current into Hall generators $H_1$, $H_2$ in the direction of

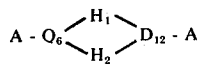

the output of Hall generators on the order of terminals $a'' - c'' - b'' - d''$.

Conversely, when the terminal B is changed-over to occupy the positive position (+) while the terminal A to occupy the negative position (−), current is flown into Hall generators $H_1$, $H_2$ in the direction of

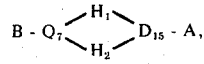

whereby the positive Hall voltage is produced in the output of Hall generators on the order of terminals $d'' - b'' - c'' - a''$.

This output of the Hall generators is applied to the transistors $Q_{16} - Q_{19}$ in the driving circuit to energize said transistors on the order of application, and torque-producing driving current is fed to motor driving coils $L_1 - L_4$. Consequently, when the polarities of power source are changeover by the switch S as hereinbefore described, the order of energization of coils is inverted so that the reversible rotation of motor may be obtained. The driving current passing through the coils $L_1 - L_4$ is fed through the transistors $Q_{20}$, $Q_{21}$ and further through the bridge-connection diode, the applied voltage thereof being determined by the variable resistor $R_{20}$. This variable resistor $R_{20}$ is connected with the constant-voltage point in the dividing circuit composed of the Zener diode $D_{21}$ and resistor $R_{22}$ so that the potential of the tap point Ta, that is, the base potential of transistor $Q_{21}$ remains at a predetermined value with respect to fluctuation of power source voltage E. Assume now that the base potential is varied by the variable resistor $R_{20}$ as shown as at $E_1$, $E_2$ and $E_3$ of FIG. 8, the relations between the torque and number of rotation of the motor vary. That is, according to prior art systems, the constant voltage imparted by the Zener diode $D_{21}$ is divided by the variable resistor $R_{20}$, divided point of which is regulated so that the number of rotation is changed. In the present invention, the number of rotation may widely be varied by addition of the following circuit. Namely, the po er source voltage is divided by the dividing circuit composed of variable resistors $R_{24}$ and $R_{25}$ and is applied to the base of transistor $Q_{22}$, and the voltage is then amplified by the transistor $Q_{23}$, output of which is applied to the aforementioned driving transistor $Q_{21}$. The use of such a circuit as described above allows to widely vary the base input of the driving transistor $Q_{21}$ by the mere slight variation of input voltage of transistor $Q_{22}$ by varying resistors $R_{24}$ and $R_{25}$, thereby enabling to widely vary the number of rotation of motor. As shown in FIG. 9, therefore, the characteristics of the voltage E and number of rotation N may be varied as along U, V, and W so that the number of rotation can greatly be varied by the mere slight variation of base potential of the transistor $Q_{22}$. In FIG. 9, there are shown set points $E_1$, $E_2$ and $E_3$ for the variable resistor $R_{20}$ to obtain the same number of rotation $N_1$, these points being widely varied according to the state of setting U, V or W of variable resistors $R_{24}$ and $R_{25}$. Accordingly, if variable resistors $R_{24}$ and $R_{25}$ are pre-adjusted to either of U, V or W, the range of variation of number of rotation by way of the variable resistor $R_{20}$ may suitably be selected.

From the above, it will be appreciated in the driving system as described above by way of the preferred embodiment that the divided point of the constant voltage is varied to vary driving current so as to vary the number of rotation and to be capable of suitably selecting the variation characteristics of voltage to number of rotation. Thus, the resulting system provides a great effect in use of brushless motors and may serve as a useful system in the field of industry.

Figure 7:
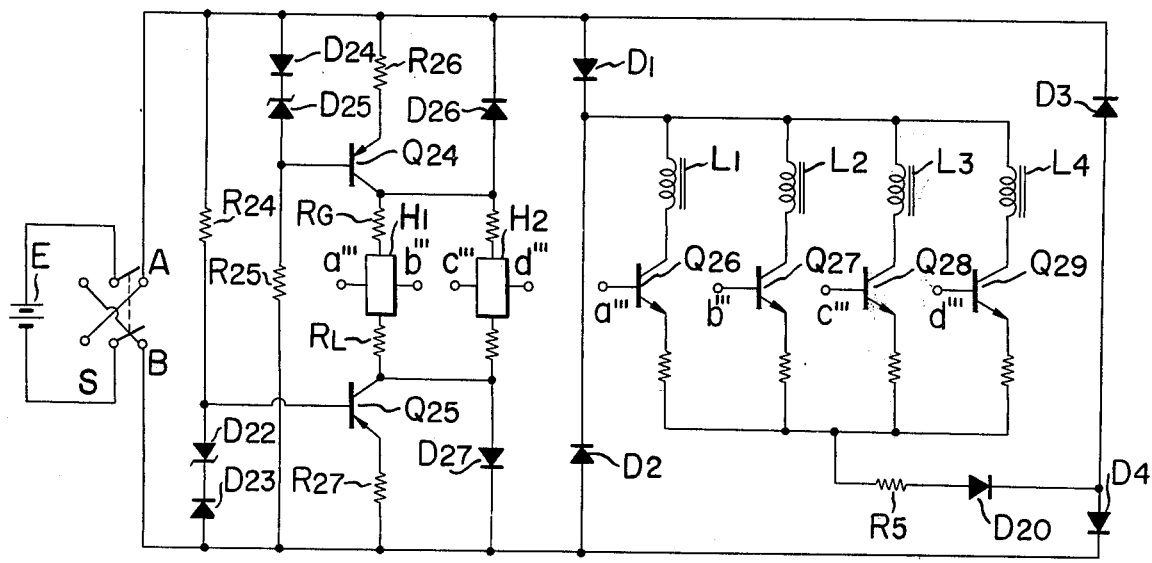
FIG. 7 is an electrical circuit diagram of a still another preferred embodiment of a brushless motor driving system in accordance with the present invention.

FIG. 7 is a motor driving circuit of a still another preferred embodiment of the present invention, in which like reference characters designate corresponding parts in the preferred embodiment previously described, such parts being omitted from their explanation. The circuit shown in FIG. 7 has all of the characteristics of the preferred embodiments shown in FIGS. 2 and 6 having the constant voltage circuit and differs from the latter only in the provision of a constant current circuit in the Hall generator unit.

Referring now to FIG. 7, a first constant current circuit is constituted by a diode $D_{24}$, a Zener diode $D_{25}$, resistors $R_{25}$, $R_{26}$ and a transistor $Q_{24}$. This circuit is formed so that constant current is fed to Hall generators $H_1$ and $H_2$. A second constant current circuit is constituted by a diode $D_{23}$, a Zener diode $D_{22}$, resistors $R_{24}$, $R_{27}$ and a transistor $Q_{25}$. This second circuit is formed so that constant current flown in the direction opposite to that of the former is fed to said Hall generators $H_1$ and $H_2$.

The Hall generators have their output terminals $a'''$ - $d'''$ connected with the bases of transistors $Q_{26}$ - $Q_{29}$, respectively, which form a motor driving circuit. In a manner similar to those circuits previously described, these transistors have their collectors connected with coils $L_1$ - $L_4$, the common emitter connected with the resistor $R_5$ and diode $D_{20}$, and the driving circuit as described is connected with the power source E through the bridge type diodes $D_1$ - $D_4$ circuit.

Operation of this circuit is as follows:

When the change-over switch S is changed-over so that the positive (+) terminal of the source E is connected with the terminal A while the negative (−) terminal thereof is connected with the terminal B, the base potential of the transistor $Q_{24}$ is driven by the diode $D_{24}$ and Zener diode $D_{25}$ into the state for constant voltage, this constant potential being remained unchanged even if the power source voltage is fluctuated. The emitter potential of said transistor is lower than that of the power source by the amount of drop due to the fixed resistor $R_{26}$. At the same time when electric supply is turned on, the transistor is energized substantially in the constant amount to feed constant current into the Hall generators $H_1$, $H_2$, the current being flown to the negative (−) side through the diode $D_{27}$. As discussed in FIG. 3, as the rotor rotates, the Hall voltage is produced in the output terminals of the Hall generators on the order of $a'''$ - $c'''$ - $b'''$ - $d'''$ to energize the transistors in the driving circuit on the order of $Q_{26}$ - $Q_{28}$ - $Q_{27}$ - $Q_{29}$ and feeding current into coils on the order of $L_1$ - $L_3$ - $L_2$ - $L_4$.

On the other hand, when switch S is changed-over to a position opposite to that of the former, the above-described second constant current circuit is actuated so as to feed constant current into the Hall generator $H_1$, $H_2$ in the direction opposite to that hereinbefore described, and the Hall voltage is produced in the output terminal on the order of $d'''$ - $b'''$ - $c'''$ - $a'''$ to energize the transistors on the order of $Q_{29}$ - $Q_{27}$ - $Q_{28}$ - $Q_{26}$ and distributing current into the corresponding coils. Thus, the rotor is caused to rotate in the direction opposite to that described previously.

Here, the constant current circuits are used in the Hall generator unit because of the fact that the Hall generator exhibits the magnetic resistance effect so that, when the Hall generator receives much of magnetic fluxes, internal resistance of the Hall generator is varied to cause the Hall voltage to vary. That is, the Hall output voltage $V_H$ is generally represented by $$V_H = \frac{KI_1B}{\alpha}$$

where K: Hall constant, $I_1$: Hall generator input current, B: field intensity which Hall generators receive, $\alpha$: thickness of the field direction of Hall generators.

On the other hand, suppose that resistors connected with input and output sides of the Hall generators are $R_G$ and $R_L$, respectively, and internal resistor of the Hall generator is $R_H$, current flown into one Hall generator is given by $$I = \frac{E}{R_G + R_H + R_L}$$

where E is the Hall generator applied voltage. Considering now the case where current flown into the Hall generator is not formed into a constant current, the resistor $R_H$ is varied due to the magnetic resistance effect of the Hall generator to vary current I accordingly. As a result, the Hall output voltage $V_H$ is affected by variation of the current to impart noises to the Hall voltage ought to be prepared for output with respect to the field intensity. For this reason, the constant current circuits are conveniently connected with the input sides of the Hall generators as shown in the preferred embodiment hereinbefore mentioned to remove the aforementioned disadvantages so that the Hall output voltage is made proportional to the field intensity received.

In the case where the Hall generator applied voltage is relatively low, the influence of the magnetic resistance effect of Hall generators causes the influence on the Hall output voltage to extend, and therefore the motor driving circuit provided with the above-described constant current circuits is preferably accepted.

Further, in the case where the applied voltage is relatively high, the aforementioned influence may be minimized by externally connecting the resistor of a greater value with the Hall generators, and therefore the Hall generator unit provided with the constant voltage circuits previously illustrated performs its function sufficiently.

Figure 10:
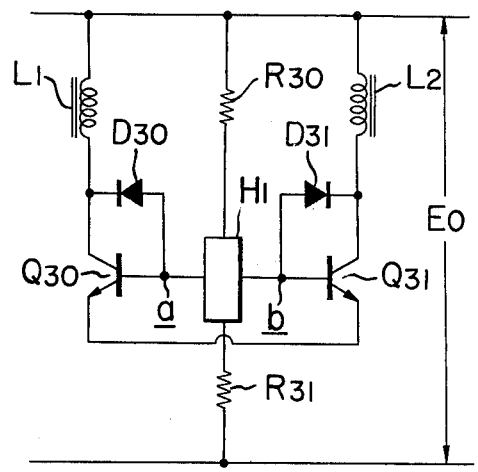
FIG. 10 is a circuit diagram of a modified form applicable to electrical circuits shown in FIGS. 1, 2, 6 and 7.

FIG. 10 is a circuit diagram partly illustrating a modified portion applicable to all of the preferred embodiments previously described. Referring to FIG. 10, a pair of output terminals a and b of Hall generator $H_1$ are connected with a pair of transistors $Q_{30}$ and $Q_{31}$, which constitute a driving circuit. Diodes $D_{30}$ and $D_{31}$ are connected between collectors of the transistors $Q_{30}$, $Q_{31}$ and output terminals a, b of the Hall generator. These transistors, of course, have their collectors connected with the driving coils $L_1$ and $L_2$ of the motor. Resistors $R_{30}$ and $R_{31}$ are provided on the input side of the Hall generator.

Although only one Hall generator $H_1$ is illustrated in this circuit, a diode circuit having quite the same construction as that described is applied also to Hall generator $H_2$.

Operation of this circuit will now be described with reference to FIG. 11.

Figure 11:
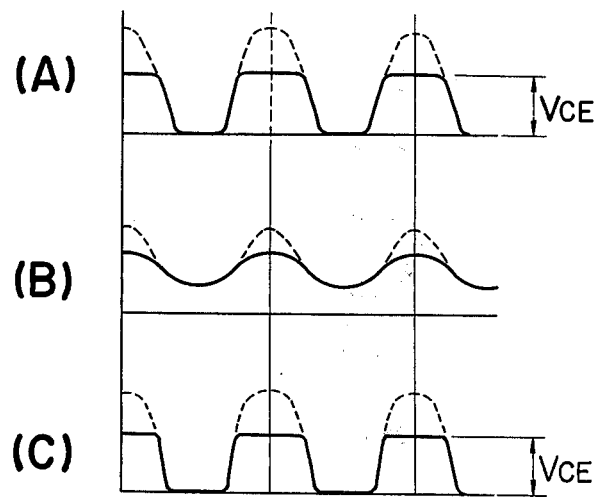
FIGS. 11 (A) – (C) are graphic representations illustrating voltage waveforms conducted into coils of the motor obtained by the electrical circuit connection shown in FIG. 10 and timed variation of voltage waveforms induced in said coils.

When the Hall generator output voltage is excessively high, the output to the transistors $Q_{30}$ and $Q_{31}$ becomes excessive and the voltage $V_{CE}$ across the collector and emitter of the transistor is saturated as shown in FIG. 11 (C). At this time, excessive current is flown into coils of the motor to tend to produce irregularities in producing rotative torque. In order to avoid this, the aforementioned diodes $D_{30}$ and $D_{31}$ are connected so as to bypass the input and output of the transistor. When the aforementioned excessive Hall output is present, the bypass-connected diode $D_{30}$ or $D_{31}$ is forward biased and energized. Therefore, the transmission route of the Hall output is formed into two systems including said bypass path to virtually decrease the amount of conduction of the transistor $Q_{30}$ or $Q_{31}$. As a result, the voltage $V_{CE}$ across the collector and emitter of the transistor is settled down to the stabilized condition as shown in FIG. 11 (B).

In other words, when the applied voltage Eo to the Hall generator rises, the excessive Hall output as hereinbefore described is divided in the diode bypass circuit to decrease the amount of conduction of the transistors $Q_{30}$ and $Q_{31}$, whereas when the applied voltage Eo drops, the amount of current flown into the diode bypass circuit is decreased to substantially stop entry of current into the transistors $Q_{30}$ and $Q_{31}$, resulting in the sensitivity of transistor being developed to obtain conduction waveforms of transistor as shown in FIGS. 11 (A) and (B), thus providing smooth rotation of the motor. Further, waveforms as indicated in dotted line of FIG. 11 designate induced voltage produced in coils. In the embodiment hereinabove described, a tendency to vary torque resulted from the excessive Hall voltage produced in conventional driving circuit may be completely corrected by the provision of the motor driving circuit provided with the aforementioned diode bypass circuit, thereby improving the efficiency of D.C. motor.

From the above, the present invention may provide a brushless motor driving system in which the reversible rotation of motor may be accomplished simply by mere switching of polarities of power source. With respect to the power source, not only switch means as shown may be used to change-over polarities of D.C. power source but also a conventional power source for producing alternating signals of low frequencies may be used, in which case, the rotational direction of motor can be inverted in response to said alternation.

I claim:

1. A driving system for reversibly rotating a brushless D.C. motor comprising, in combination: a rotor, polarity changing voltage source means adapted to rotate reversely said rotor, a plurality of windings positioned in torque-producing relation to said rotor, rotational position detecting means having a plurality of output terminals associated with said rotor in such relation as to detect rotational position of said rotor, a plurality of driving circuits adapted to arrange said plurality of windings and a plurality of output terminals of said rotational position detecting means in corresponding relation, said circuits being capable of applying the exciting current to said windings in response to the output of said rotational position detecting means, and automatic inversion-control means adapted to automatically reverse the rotational direction of said rotor, said means connected to said voltage source means and operable for automatically switching the operation order of said driving circuits in response to change in polarities of said voltage source means thereby to change the energizing order of current applied to said windings, whereby the rotor may be reversed.

2. A system according to claim 1, wherein said automatic inversion-control means includes means for transmitting the inverting signals to said rotational position detecting means in order to automatically switch the producing order of signals produced from the output terminals of said rotational position detecting means in response to change in polarities of said voltage source.

3. A system according to claim 2, wherein said inverting signal transmission means further includes a rectification circuit.

4. A system according to claim 3, wherein said inverting signal transmission means further includes a constant-voltage circuit connected with the input side of said rotational position detecting means to apply the constant voltage to said detecting means.

5. A system according to claim 3, wherein said inverting signal transmission means further includes a constant-current circuit connected with the input side of said rotational position detecting means to apply the constant current to said detecting means.

6. A system according to claim 1, wherein said automatic inversion-control means includes signal-producing means adapted to reverse the operational order of said plurality of driving circuits in response to change in polarities of said voltage source means, said signal-producing means being connected with said driving circuits.

7. A system according to claim 1, wherein said automatic inversion-control means further includes a reversible shift counter circuit connected with said voltage source means, the plurality of output terminals of said rotational position detecting means and said plurality of driving circuits and operable for inverting the operational order of said driving circuits by reception of detecting-signals received from a plurality of output terminals of said rotational position detecting means in response to inversion of polarities of said voltage source means.

8. A system according to claim 1, wherein said rotational position detecting means includes a magnetic flux sensing element adapted to detect the magnetic flux between said rotor and said windings so as to generate electrical signals according to the value thus detected.

9. A system according to claim 1, wherein said plurality of driving circuits include a circuit having semiconductor elements capable of coming into the conductive condition in response to the output of said rotational position detecting means.

10. A system according to claim 9, wherein said plurality of driving circuits further include a shunt forming circuit bypassing said semi-conductor elements and connected with said rotational position detecting means and said windings.

11. A driving system for reversibly rotating a brushless D.C. motor comprising, in combination: a rotor, polarity changing voltage source means adapted to rotate reversely said rotor, a pluraltiy of windings positioned in torque-producing relation to said rotor, rotational position detecting means having a plurality of output terminals associated with said rotor in such relation as to detect rotational position of said rotor, a plurality of driving circuits adapted to arrange said plurality of windings and a plurality of output terminals of said rotational position detecting means in corresponding relation, said circuits being capable of applying the exciting current to said windings in response to the output of said rotational position detecting means, automatic inversion-control means adapted to automatically reverse the rotational direction of said rotor, said means connected to said voltage source means and operable for automatically switching the operation order of said driving circuits in response to change in polarities of said voltage source means thereby to change the energizing order of current applied to said windings for reversing the rotational direction of said rotor, and voltage regulating means connected with said voltage source means and said driving circuits to divide said source voltage and applying them to said driving circuits, said voltage regulating means being capable of varying the rotational speed of motor.

12. A system according to claim 11, wherein said voltage regulating means includes an amplification circuit adapted to amplify said divided source voltages and applying them to said driving circuits.

13. A D.C. motor and control system therefor comprising, in combination: a source of unidirectional potential, switching means for changing the direction of said potential source, a rotor having magnetic poles of opposite polarities thereon, a stator having flux-producing windings positioned in torqueproducing relation to said rotor, Hall generators positioned in fixed relation to said stator and angularly spaced apart from each other in magnetic relation with said rotor so as to sense the magnitude of the rotor flux density as a function of the angular position of said rotor and to produce Hall voltages in accordance with said magnitude, driving means adapted to be connected to said Hall generators and said stator windings for applying the exciting current to said windings in response to said Hall voltages, and rotational direction changing means connected to said driving means and operable in response to said switching means for changing the exciting current applying order of said driving means thereby to automatically reverse the rotational direction of the rotor.

14. A D.C. motor and control system therefor comprising, in combination: a voltage source, polarity changing means connected to said voltage source, a rotor having magnetizable opposite polarities thereon, flux-producing windings positioned in torque-producing relation to said rotor, magnetic flux sensing means positioned in magnetic relation to said rotor so as to sense the magnitude of the rotor flux density as a function of the angular position of said rotor and to generate electrical signals representing the instantaneously changing rotational speed of said rotor, driving means adapted to receive said electrical signals of the magnetic flux sensing means for applying the exciting current to said windings, said driving means having a first state wherein the exciting current is applied in a predetermined order to said windings for achieving a normal rotational direction of the rotor and a second state wherein the exciting current is applied in a reversed order to said windings for achieving a reverse relation of said rotor, and rotational direction changing means arranged to become operable in response to said polarity changing means to alternate the operational states of said driving means in accordance with the voltage polarity set by the polarity changing means.

15. A D.C. motor and control system therefor comprising, in combination: a voltage source, polarity changing means connected to said voltage source, a magnetizable rotor, flux-producing windings positioned in torque-producing relation to said rotor, Hall generators disposed on said rotor in such relation as to detect the position of said rotor, constant-voltage circuits adapted to feed current to said Hall generators, a motor driving circuit connected with said Hall generators and said windings and having a plurality of transistors in number corresponding to the number of said windings, a diode bridge circuit connected with said Hall generators and said motor driving circuit so as to normally feed current in a predetermined direction, a reversible shift ring counter connected with the output side of said Hall generators, means for applying the output of said counter to the transistors in said motor driving circuit, and means for inverting the shifting direction of said counter by inversion of polarities in response to said polarity changing means, whereby the rotational direction of motor may be automatically reversed in response to inversion of polarities of the voltage source.

* * * * *